United States Patent
Rowe, Jr.

(10) Patent No.: US 7,446,663 B2
(45) Date of Patent: Nov. 4, 2008

(54) METHOD OF FORMING AN RF CIRCUIT ASSEMBLY HAVING MULTIPLE ANTENNA PORTIONS

(75) Inventor: Harry B. Rowe, Jr., Indianapolis, IN (US)

(73) Assignee: Alcoa Closure Systems International, Inc., Crawfordsville, IN (US)

( * ) Notice: Subject to any disclaimer, the term of this patent is extended or adjusted under 35 U.S.C. 154(b) by 128 days.

(21) Appl. No.: 11/106,936

(22) Filed: Apr. 15, 2005

(65) Prior Publication Data

US 2005/0231371 A1    Oct. 20, 2005

Related U.S. Application Data

(60) Provisional application No. 60/571,255, filed on May 14, 2004, provisional application No. 60/563,714, filed on Apr. 20, 2004.

(51) Int. Cl.
   *G08B 13/14* (2006.01)
(52) U.S. Cl. .................. 340/572.7; 340/572.8; 343/873
(58) Field of Classification Search .............. 340/572.7, 340/572.8; 343/873, 728; 434/824
See application file for complete search history.

(56) References Cited

U.S. PATENT DOCUMENTS

| | | | |
|---|---|---|---|
| 4,583,099 A * | 4/1986 | Reilly et al. ................. | 343/895 |
| 5,471,196 A | 11/1995 | Pilested ...................... | 340/572 |
| 5,566,441 A | 10/1996 | Marsh et al. .................. | 29/600 |
| 5,574,470 A * | 11/1996 | de Vall ......................... | 343/895 |
| 5,608,417 A * | 3/1997 | de Vall ......................... | 343/895 |
| 5,646,446 A | 7/1997 | Nicewarner, Jr. et al. .... | 257/723 |
| 5,831,531 A * | 11/1998 | Tuttle ........................ | 340/568.2 |
| 5,841,350 A * | 11/1998 | Appalucci et al. ......... | 340/572.3 |
| 5,902,437 A * | 5/1999 | McDonough et al. ........ | 156/234 |
| 5,945,920 A | 8/1999 | Maletsky ................ | 340/825.54 |
| 6,045,652 A | 4/2000 | Tuttle et al. .................. | 156/292 |
| 6,130,612 A | 10/2000 | Castellano et al. ........ | 340/572.6 |
| 6,165,817 A | 12/2000 | Akram et al. ................ | 438/118 |
| 6,226,619 B1 | 5/2001 | Halperin et al. ................ | 705/1 |
| 6,229,443 B1 | 5/2001 | Roesner ................... | 340/572.1 |
| 6,320,556 B1 | 11/2001 | Cyman et al. ............... | 343/873 |
| 6,366,260 B1 | 4/2002 | Carrender .................... | 343/866 |
| 6,384,727 B1 | 5/2002 | Ciprizio et al. ........... | 340/572.7 |
| 6,429,831 B2 * | 8/2002 | Babb .......................... | 343/895 |
| 2003/0184163 A1 | 10/2003 | Devilbiss et al. ............ | 307/151 |

* cited by examiner

Primary Examiner—George A Bugg
Assistant Examiner—Hoi C Lau
(74) Attorney, Agent, or Firm—Wood, Phillips, Katz, Clark & Mortimer

(57) ABSTRACT

The present invention is directed to a method of forming a circuit assembly, such as including a radio frequency identification device (RFID), wherein first and second portions of an antenna of the circuit assembly are provided on respective first and second substrates, with the associated electrical circuit, having first and second electrical contacts on respective opposite sides thereof, positioned between the first and second substrates. Alternatively, first and second portions of an antenna of the circuit assembly are provided on a substrate, with the associated electrical circuit, having first and second electrical contacts on respective opposite sides thereof, electrically joined to the respective antenna portions. Highly efficient manufacture is thus promoted.

9 Claims, 6 Drawing Sheets

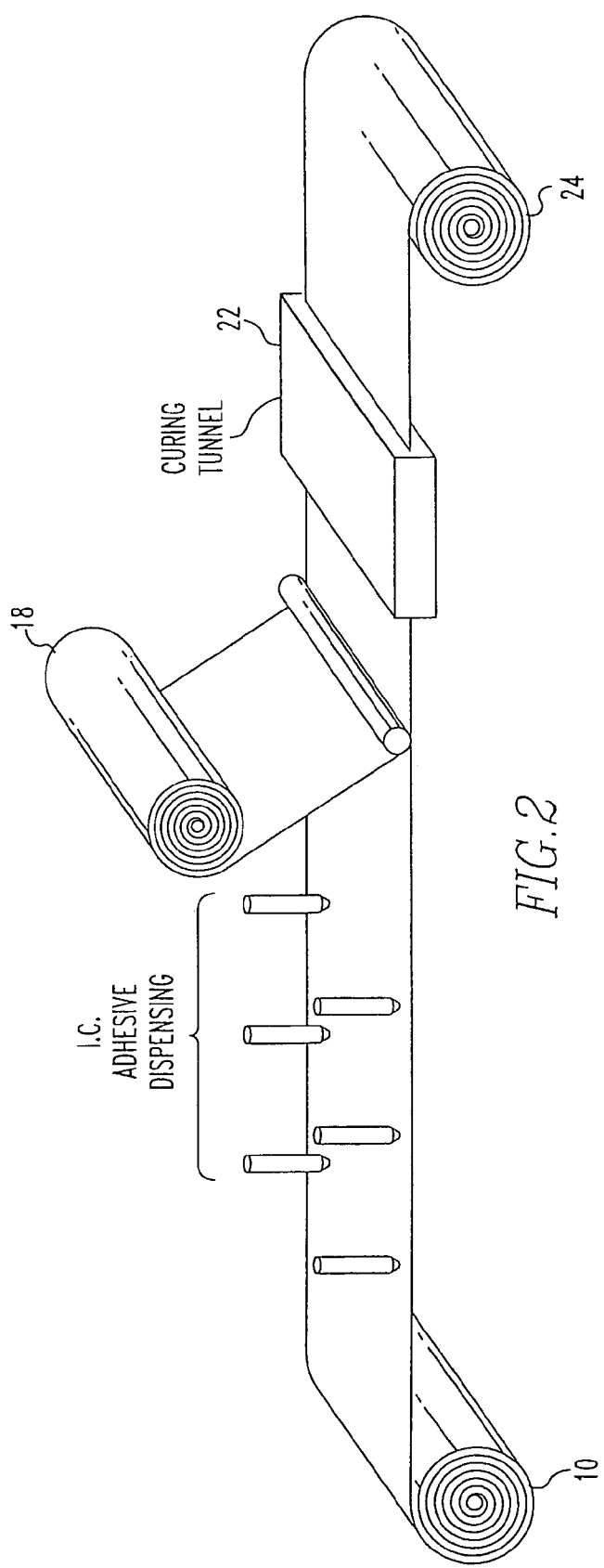

METHOD OF FORMING AN RF CIRCUIT ASSEMBLY HAVING MULTIPLE ANTENNA PORTIONS

CROSS REFERENCE TO RELATED APPLICATIONS

This application claims the benefit of U.S. Provisional Application Ser. No. 60/563,714 filed on Apr. 20, 2004, and U.S. Provisional Application Ser. No. 60/571,255 filed on May 14, 2004, the disclosures of which are fully incorporated by reference herein.

TECHNICAL FIELD

The present invention relates generally to a method of forming a circuit assembly, such as including a radio frequency identification device (RFID), and more particularly to a method of forming a circuit assembly including an antenna, wherein first and second portions of the antenna are either (1) formed on respective substrates between which the associated circuit is positioned; or (2) formed on substrate, with the associated circuit having electrical connectors on opposite sides thereof respectively electrically joined to the antenna positions.

BACKGROUND OF THE INVENTION

Use of various types of electrical circuits, including radio frequency identification devices (RFID) is becoming increasingly widespread as the cost of such circuitry has decreased dramatically in recent years. Decreasing manufacturing costs have permitted use of such devices in association with an ever-increasing array of products, including individual consumer products. The advent of the use of such devices facilitates efficient inventory control, generation of information pertaining to consumer buying habits, and the like.

U.S. Pat. No. 5,471,196, U.S. Pat. No. 6,229,443, U.S. Pat. No. 5,945,920, U.S. Pat. No. 6,130,612, U.S. Pat. No. 6,045,652, U.S. Pat. No. 5,646,446, U.S. Pat. No. 6,165,817, U.S. Pat. No. 6,320,556, U.S. Pat. No. 6,366,260, U.S. Pat. No. 6,384,727, U.S. Pat. No. 6,226,619, U.S. Pat. No. 5,566,441, and U.S. Application No. 2003/0184163, all hereby incorporated by reference, illustrate various configurations for electrical circuits including RFID's, methods for forming such devices, and arrangements for associating such devices with various products.

In a typical application, an electrical circuit such as an RFID is incorporated in a circuit assembly, which includes an associated antenna. To facilitate cost-effective manufacture, such antennas may be provided in the form of printed conductive inks, foil laminates, electrically conductive etchings, and the like. Manufacture entails operative association of the electrical circuit with the antenna, typically entailing joining two electrical connectors of the circuit in electrically conductive relationship with different portions of the antenna.

In an arrangement wherein the electrical connectors of an RFID circuit, or like electrical circuit, are positioned on one side of the circuit device, careful placement of the circuit with respect to an associated antenna is typically required to assure that the connectors are placed in the desired conducting relationship with their respective antenna portions. As will be appreciated, the need to precisely relatively position such components detracts from efficient, high-speed manufacture, undesirably increasing manufacturing costs.

The present invention is directed to a method of forming a circuit assembly, which may include a circuit in the form of an RFID, wherein efficient positioning of the circuit in operative association with an associated antenna is facilitated.

SUMMARY OF THE INVENTION

The present invention is directed to a method of forming a circuit assembly, such as including a radio frequency identification device (RFID), wherein first and second portions of an antenna of the circuit assembly are provided on respective first and second substrates, with the associated electrical circuit, having first and second electrical contacts on respective opposite sides thereof, positioned between the first and second substrates. Alternatively, first and second portions of an antenna of the circuit assembly are provided on a substrate, with the associated electrical circuit, having first and second electrical contacts on respective opposite sides thereof, electrically joined to the respective antenna portions. Highly efficient manufacture is thus promoted.

In accordance with the present invention, a method of forming a circuit assembly including an antenna comprises the step of providing a first substrate, and providing a first portion of the antenna on the first substrate. In accordance with the alternative method noted above, the method comprises the step of providing a substrate, and providing first and second portions of the antenna on the substrate. Antenna formation can be effected in accordance with known techniques, such as printing of electrically-conductive inks, adhesive lamination of conductive foils, etching, or the like.

The present methods further include providing an electrical circuit having first and second electrical connectors on respective opposite sides thereof. The electrical circuit may comprise a radio frequency identification device (RFID), or other electrical circuit for which low-cost assembly with an associated antenna is desired.

The present methods contemplate that the electrical circuit is placed on the first substrate, or according to the alternative method, the substrate, to join the first connector of the circuit in electrically conducting relationship with the first portion of the antenna. In accordance with the preferred practice of the present invention, this is effected by providing an electrically conductive material, such as a conductive adhesive, on the first substrate or substrate prior to placing the circuit thereon, so that the conductive material joins the first connector of the circuit in electrically conducting relationship with the first portion of the antenna.

The present invention further entails providing a second substrate, and providing a second portion of the antenna on the second substrate. In turn, this second substrate is placed on the circuit to join the second connector of the circuit in electrically conducting relationship with the second portion of the antenna on the second substrate, thereby forming the circuit assembly. Again, it is preferred that a conductive material be provided on at least one of the second substrate and the electrical circuit prior to placing the second substrate on the circuit, to thereby join the second connector of the circuit in electrically conducting relationship with the second portion of the antenna.

The alternative method further entails joining the second connector of the circuit in electrically conducting relationship with the second portion of the antenna on the substrate, thereby forming the circuit assembly. Again, it is preferred that a discrete quantity of conductive material be provided to extend from the second electrical connector beyond the edge of the electrical circuit to contact the second portion of the antenna, to thereby join the second connector of the circuit in electrically conducting relationship with the second portion of the antenna.

Depending upon the nature of the electrically conductive material preferably employed to electrically join the first and second connectors of the circuit with the respective first and second portions of the antenna, the conductive material may be cured by exposing the circuit assembly to heat, light, or radiation to effect curing.

Depending upon the nature of the circuit assembly, and the particular configuration of the antenna thereof, it is within the purview of the present method to join the first and second antenna portions to each other, in electrically conductive relationship, during the step of placing the second substrate on the electrical circuit. To this end, the antenna portions are joined at a location spaced apart from the first and second electrical connectors.

For some applications, it can be desirable to provide a third substrate, and provide a third antenna portion thereon. For these applications, the third substrate is placed on the second substrate for formation of the circuit assembly.

Other features and advantages of the present invention will become readily apparent from the following detailed description, the accompany drawings, and the appended claims.

BRIEF DESCRIPTION OF THE DRAWINGS

FIG. 2 is a diagrammatic view illustrating practice of the present invention for formation of circuit assemblies in a multiple layer, parallel manufacturing process.

DETAILED DESCRIPTION

Figure 1:
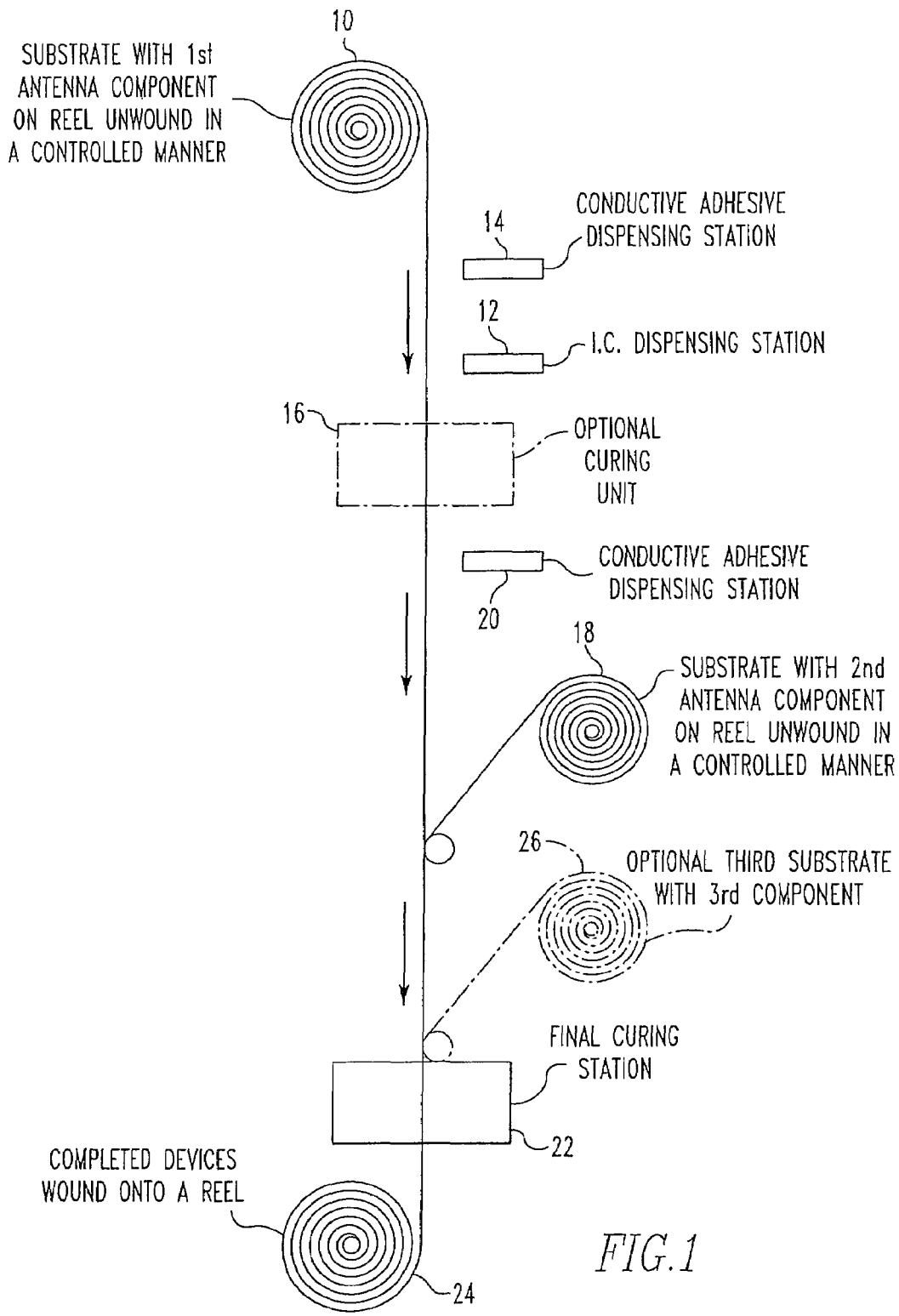
FIG. 1 is a diagrammatic view illustrating the method of forming a circuit assembly in accordance with the principles of the present invention.

While the present invention is susceptible of embodiment in various forms, there is shown in the drawings, and will hereinafter be described, presently preferred embodiments, with the understanding that the present disclosure is to be considered as an exemplification of the invention, and is not intended to limit the invention to the specific embodiment illustrated.

The present invention is directed to a method for manufacturing a circuit assembly, such as including an integrated circuit and an antenna, using an integrated circuit that permits a single connection to be formed on each of top and bottom surfaces of the circuit, rather than with both connections on a single side of the circuit. The present invention may advantageously be employed for manufacture of a circuit assembly including a radio frequency identification device (RFID), with low-cost manufacturing of such an assembly permitted by the present invention facilitating cost-effective, widespread use of such circuit assemblies. One such application particularly contemplated is the use of such circuit assemblies in association with plastic closures applied to associated containers, typically with disposition of the circuit assembly, and the substrate on which it is positioned, generally at the inside surface of the top wall portion of the closure.

As illustrated in FIG. 1, the present method contemplates that a first substrate, which may comprise a web of suitable polymer material, is provided on which a first portion of an antenna of the circuit assembly is provided. The first portion of the antenna, such as one-half of a dipole, is formed on the first substrate such as by printing with electrically conductive ink, etching, or other suitable means for in situ formation, as are known in the art. Efficient manufacture of the present circuit assembly is facilitated by disposition of a plurality of the first antenna portions along the length of the first substrate. FIG. 1 illustrates the first substrate, with the first antenna portions thereon, on a reel of the first substrate 10.

Figure 1A:
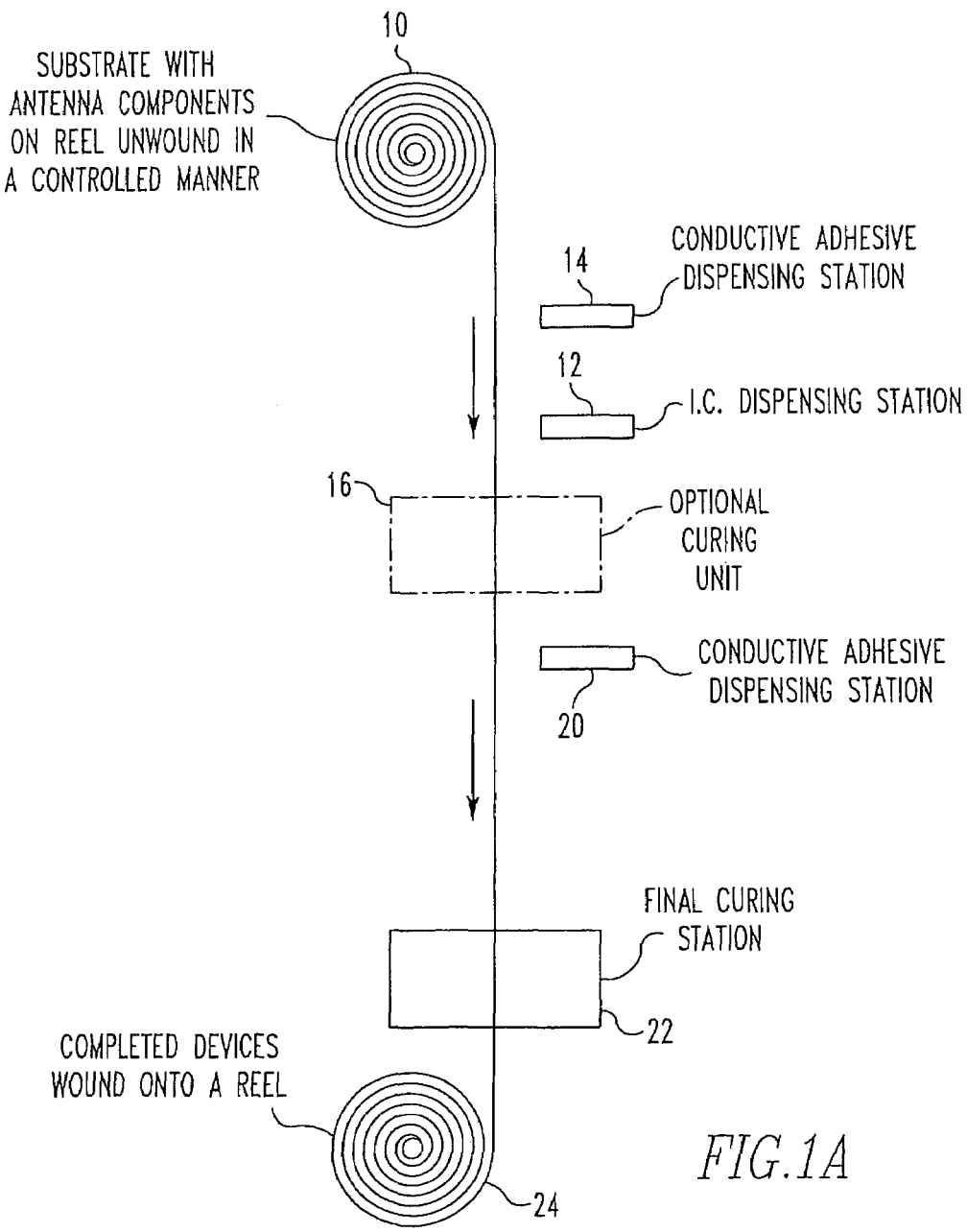
FIG. 1A is a diagrammatic view illustrating the method of forming a circuit assembly in accordance with the principles of the alternative embodiment of the present invention.
Figure 3A:
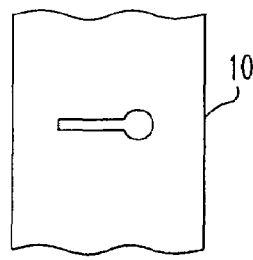
FIGS. 3A-3H illustrate various embodiments for antennas suitable for use in formation of the present circuit assembly.
Figure 3B:
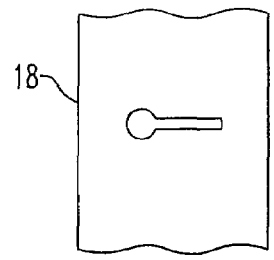
Figure 3C:
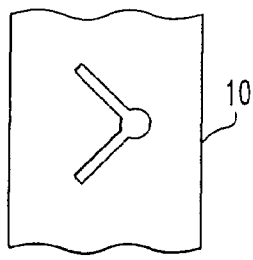
Figure 3D:
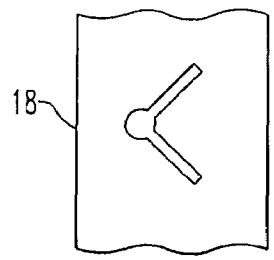
Figure 3E:
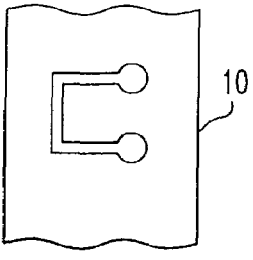
Figure 3F:
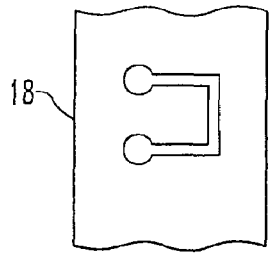
Figure 3G:
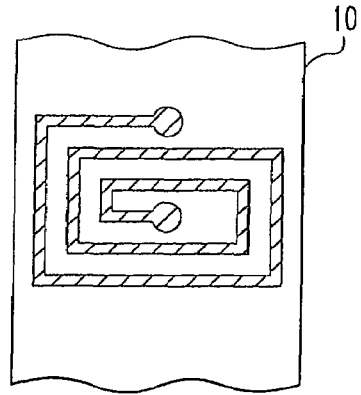
Figure 3H:
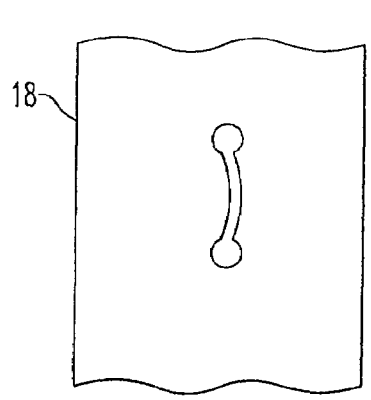

As illustrated in FIG. 1A, the alternative method contemplates that a substrate is provided on which first and second portions of an antenna of the circuit assembly is provided. Each portion of the antenna, such as one-half of a dipole, is formed on the substrate as described above. Efficient manufacture of the present circuit assembly is facilitated by disposition of a plurality of the first and second antenna portions along the length of the substrate (see FIGS. 6A, 6B).

Formation of circuit assemblies in accordance with the present invention entails providing electrical circuits having first and second electrical connectors on respective opposite sides thereof, and placing the electrical circuits on the first substrate, or alternatively the substrate, to join the first connector of each circuit in electrically conducting relationship with the respective first antenna portion on the first substrate, or alternatively the substrate. To this end, FIGS. 1 and 1A illustrate integrated circuit (IC) dispensing station 12 at which the individual electrical circuits are placed on the first substrate, or alternatively the substrate, 10, in respective association with the first portions of the antenna provided on the first substrate, or alternatively the substrate.

Notably, the present invention contemplates that a single connector for the circuit be provided on one side thereof, with the present method contemplating that an electrically conductive material, such as a conductive adhesive, be applied to the first substrate or alternatively to the substrate, prior to positioning of the circuit thereon. To this end, FIGS. 1 and 1A illustrate conductive adhesive dispensing station 14 positioned immediately upstream of IC dispensing station 12. Because only a single connector for each of the circuits is connected with its respective antenna portion during manufacture in this fashion, less precision is required in placement of the circuits, thus facilitating economical, high speed manufacture.

With further reference to FIGS. 1 and 1A, optional curing unit 16 can be provided, with the first substrate, or alternatively the substrate, directed therethrough so as to cure the conductive material which electrically joins the first connector of the circuit with the first antenna portion.

The present method contemplates that a second substrate be provided, with a second portion of the antenna of the circuit assembly provided on the second substrate. To this end, a reel of the second substrate 18 illustrated in FIG. 1, with a plurality of the second antenna components provided thereon, with the reel unwound in a controlled manner. Conductive adhesive dispensing station 20 is preferably provided upstream of reel 18 to thereby place conductive material, such as conductive adhesive, on the integrated circuits previously placed on the first substrate. By dispensing the conductive adhesive or epoxy on the exposed surface of each of the integrated circuits, the second electrical connector of each circuit can be joined in electrically conductive relationship with the respective second antenna portion provided on the second substrate 18. It will be noted that it is within the purview of the present invention for this further layer of conductive adhesive to be placed on the second substrate, and the second antenna portions thereon.

The alternative method contemplates that a second portion of the antenna of the circuit assembly also be provided on the substrate, in spaced relationship to a respective first portion of the antenna. To complete formation of the circuit assembly as shown in FIG. 1A, the second connector of the electrical circuit is joined in electrically conducting relationship with the respective second antenna portion. Conductive adhesive dispensing station 20 is preferably provided to thereby place conductive material, such as conductive adhesive, on each of the integrated circuits previously placed on the first substrate. By dispensing the conductive adhesive or epoxy on the exposed surface of each of the integrated circuits so that it extends beyond the edge of the circuit, the second electrical connector of each circuit can be joined in electrically conductive relationship with the respective second antenna portion provided on the substrate 10.

The sandwich-like structure, or structure of the alternative method, can now be directed through a final curing station at 22 for curing the electrically conductive material, such as by exposure to heat, light, or radiation, depending upon the particular composition of the electrically conductive adhesive or other material.

After completion of formation of the circuit assemblies, the assemblies, and the associated substrates, can be wound onto a roll 24 for subsequent storage, and ultimate use of the assemblies in a manufacturing process. The completed assemblies can be efficiently unwound from the roll 24, with the substrates suitably cut and severed so that individual circuit assemblies, including the integrated RFID circuit, or other circuit, and associated antenna portions, can be efficiently placed in association with a product, such as at the inside surface of a plastic closure for a container.

FIG. 2 illustrates an embodiment of the present invention wherein plural circuit assemblies are being formed in a "multi-lane", parallel manufacturing process, wherein multiple antenna portions are provided on each of the first and second substrates, with multiple dispensing stations in parallel producing multiples of the completed circuit assemblies simultaneously.

FIGS. 3A-3H shows diagrammatic views illustrating various forms of first and second antenna portions for practice of the present invention, with the antenna portions respectively provided on two facing substrates, with one or more conductive paths therebetween. When the antenna comprises a single dipole, each of the first and second antenna portions can be provided as shown for connection to a respective one of the first and second electrical connectors of the associated circuit. The antenna may alternatively be formed as a double dipole, as shown, or as a folded dipole. For this embodiment, it is contemplated that the first and second antenna portions are joined to each other in electrically conductive relationship, at a location spaced apart from the first and second electrical connectors, during the step of placing the second substrate. Thus, the first and second antenna portions are electrically joined to each other at a location wherein the associated circuit is not positioned between the first and second substrates. Selected portions of each of the antenna components are suitably insulated to permit formation of this antenna structure.

FIGS. 3A-3H illustrates a further configurations of the antenna for formation of the present circuit assembly, wherein a loop antenna is provided on one of the first and second substrates, with a crossover (having exposed pads with the crossover insulated therebetween) provided on the other of the substrates. As in the case of the above-described folded dipole antenna, this configuration for the loop antenna places the first electrical connector of the circuit in contact with one of the contacts of the loop, and the other of the first and second connectors in electrical contact with one of the connectors of the antenna crossover. The remaining contacts of the loop and the crossover are thus joined in electrically conducting relationship around the integrated circuit positioned between the substrates.

Figure 4A:
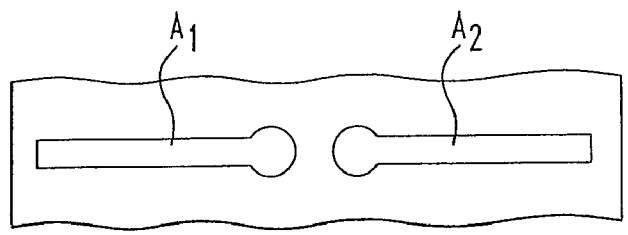
FIGS. 4A-4C are diagrammatic views illustrating the sequence of formation of a circuit assembly in accordance with the alternative embodiment of the present invention.
Figure 4B:
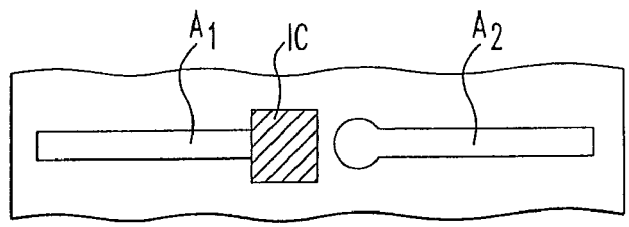
Figure 4C:
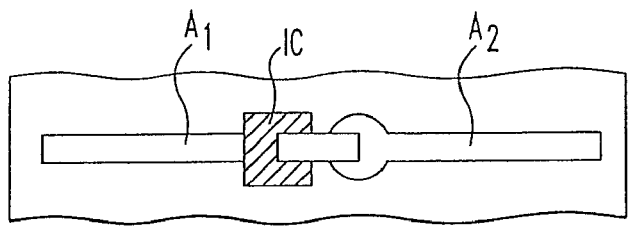
Figure 5:
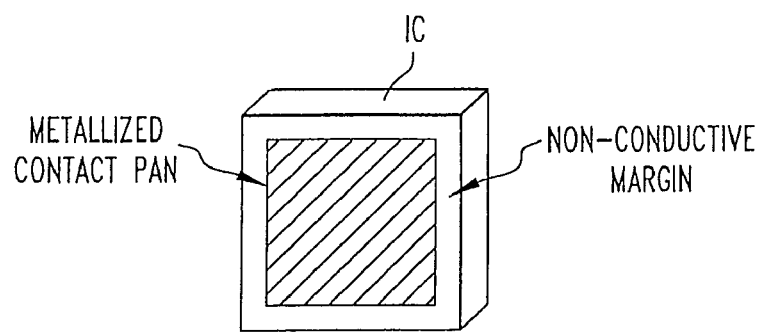
FIG. 5 is a diagrammatic view of an electrical circuit having non-conductive margins for practicing the alternative embodiment of the present invention.

FIGS. 4A-4C diagrammatically illustrate the sequence of steps performed in practicing the alternative embodiment of the invention for formation of the present circuit assembly. As illustrated, first and second antenna portions, designated $A_1$ and $A_2$, are provided on the associated substrate, with the associated electrical circuit, designated IC, thereafter placed on the first antenna portion, subsequent to application of a suitable conductive material thereon. Formation of the assembly is completed by deposition of conductive material on the surface of the electrical circuit, so that the material contacts the second connector of the circuit, and extends beyond the edge of the electrical circuit for contact with the second antenna portion $A_2$. If desired, a laterally movable dispensing nozzle can be employed for application of the conductive material for joining the second connector and second antenna portion, with the material exhibiting sufficient viscosity as to avoid unintended flow beneath the electrical circuit, and inadvertent shorting of the circuit by undesired connection with the first electrical connector on the lower surface of the circuit. To further avoid any such unintended shorting of the circuit, it is presently preferred that the first and second electrical connectors of each circuit are spaced from edge portions thereof, such as illustrated diagrammatically in FIG. 5, where the metalized contact pad or electrical connector on each side of the electrical circuit is surrounded by a non-conductive margin. Formation of the electrical connection between the second electrical connector of the circuit, and the associated second antenna portion, such as by use of the above-described laterally movable dispensing nozzle, in a generally elongated or oblong configuration, facilitates the desired electrical connection between the second connector and the second antenna portion.

Figure 6A:
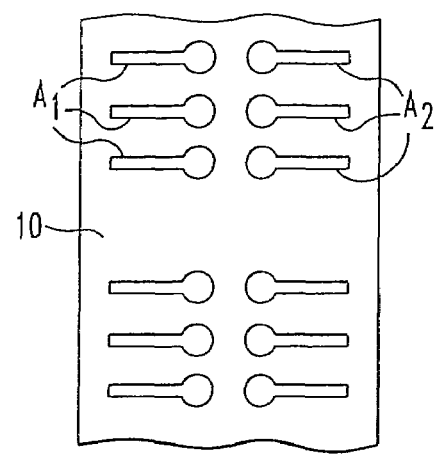
FIGS. 6A and 6B are diagrammatic views illustrating multiple antenna portions, arranged in cooperative pairs, on an associated substrate.
Figure 6B:
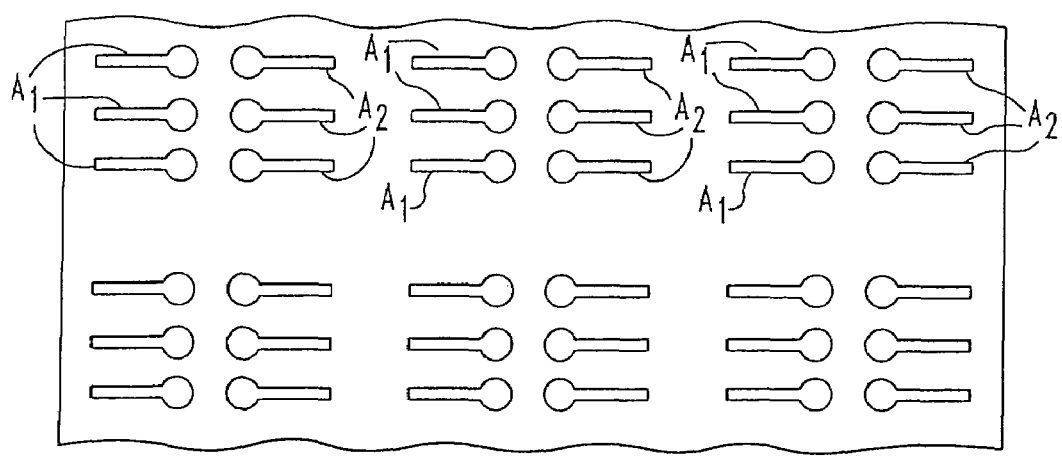

FIGS. 6A and 6B illustrate contemplated configurations of the first and second antenna portions $A_1$ and $A_2$ on an associated substrate 10. FIG. 6A illustrates a single series of first and second antenna portions, while FIG. 6B illustrates plural adjacent pairs of the antenna portions, as can be efficiently employed for "multi-lane", parallel manufacturing of the present circuit assembly.

Various configurations for the antenna of the present circuit assembly can be employed, including a pair of single dipole antenna portions, a pair of double dipole portions, or a loop antenna. For an antenna having a loop configuration, a first end of the antenna provides the first portion thereof, positioned beneath the associated electrical circuit, with the other end of the loop, providing the second antenna portion for formation of a circuit assembly in accordance with the present invention.

For some applications, it can be desirable to provide each of the electrical circuit assemblies with a third antenna portion. To this end, a third substrate 26 can be provided, with the third antenna portions provided thereon, such as illustrated in phantom line in FIG. 1. This third antenna portion need not necessarily be joined in electrically conductive relationship with the first and second antenna portions, but instead can add a conductive plane to function to provide tuning, reflectance, or other functions as are known, thus permitting formation of more complex antenna structures.

Other features and advantages of the present invention will become readily apparent from the following detailed description, the accompanying drawings, and the appended claims.

What is claimed is:

1. A method of forming a circuit assembly including an antenna, comprising the steps of:
    providing a first substrate;
    providing a first portion of an antenna on said first substrate;
    providing an electrical circuit having first and second electrical connectors on respective opposite sides thereof;
    placing said circuit on said first substrate to join said first connector in electrically conducting relationship with said first portion of said antenna;
    providing a second substrate;
    providing a second portion of said antenna on said second substrate;
    placing said second substrate on said circuit to join said second connector in electrically conducting relationship with said second portion of said antenna to form said circuit assembly; and
    joining said first and second antenna portions to each other in electrically conductive relationship during said step of placing said second substrate, said antenna portions being joined at a location spaced apart from said first and second electrical connectors.

2. A method of forming a circuit assembly including an antenna, comprising the steps of:
    providing a substrate having a first side and an opposite second side;
    providing an antenna having first and second portions on said substrate, each of the first and second portions being located on the first side of the substrate;
    providing an electrical circuit having first and second electrical connectors on opposite first and second sides thereof, respectively;
    placing the first side of said circuit parallel to and adjacent to the first side of said substrate to join said first connector of said electrical circuit in electrically conducting relationship with said first portion of said antenna; and
    joining said second connector of said electrical circuit in electrically conducting relationship with said second portion of said antenna to form said circuit assembly by applying a flowable electrically conductive material onto the electrical circuit and the substrate, said flowable electrically conductive material extending continuously from the second connector of said electrical circuit to the second portion of said antenna.

3. A method of forming a circuit assembly including an antenna in accordance with claim 2, including:
    providing an electrically conductive material on said substrate prior to placing said circuit thereon so that said conductive material joins said first connector in electrically conducting relationship with said first portion of said antenna.

4. A method of forming a circuit assembly including an antenna in accordance with claim 3, said joining step including:
    providing an electrically conductive material contacting said second connector and extending beyond an edge of said electrical circuit to contact said second portion of said antenna to thereby join said second connector in electrically conducting relationship with said second portion of said antenna.

5. A method of forming a circuit assembly including an antenna in accordance with claim 4, including:
    curing said electrically conductive material by exposing said circuit assembly to heat, light, or radiation.

6. A method of forming a circuit assembly including an antenna in accordance with claim 2, wherein:
    said first and second electrical connectors are each spaced from edge portions of said electrical circuit.

7. A method of forming a circuit assembly including an antenna in accordance with claim 2, wherein:
    said electrical circuit comprises a radio frequency identification device (RFID).

8. A method of forming a circuit assembly including an antenna in accordance with claim 2, wherein:
    said steps of providing said antenna portions comprises printing, etching, or other in situ formation of said antenna portions.

9. A method of forming a circuit assembly including an antenna in accordance with claim 4, wherein:
    said step of providing an electrically conductive material contacting said second connector includes providing an electrically conductive material with sufficient viscosity to prevent unintended flow by capillary action beneath said electrical circuit.

* * * * *